United States Patent [19]

Stroem

[11] Patent Number: 4,573,315
[45] Date of Patent: Mar. 4, 1986

[54] LOW PRESSURE LOSS, CONVECTIVELY GAS-COOLED INLET MANIFOLD FOR HIGH TEMPERATURE RADIAL TURBINE

[75] Inventor: Sigmunn Stroem, Kongsberg, Norway

[73] Assignee: A/S Kongsberg Vapenfabrikk, Norway

[21] Appl. No.: 610,584

[22] Filed: May 15, 1984

[51] Int. Cl.[4] .............................................. F02C 3/00
[52] U.S. Cl. ..................................... 60/39.37; 60/752
[58] Field of Search ..................... 60/39.36, 39.37, 752, 60/753, 754, 755, 756, 757, 758, 759, 760

[56] References Cited

U.S. PATENT DOCUMENTS

| | | | |
|---|---|---|---|
| 2,350,616 | 6/1944 | Johnson | 415/204 |
| 2,470,126 | 5/1949 | Altorfer | 415/135 |
| 2,494,821 | 1/1950 | Lombard | 60/39.37 |
| 2,594,808 | 4/1952 | Rubbra | 60/39.37 |
| 2,608,057 | 8/1952 | Boyd et al. | 60/39.37 |
| 2,609,664 | 9/1952 | Staley | 60/39.37 |
| 2,648,491 | 8/1953 | Wood | 60/39.37 |
| 2,801,519 | 8/1957 | Wood | 60/39.75 |
| 2,919,103 | 12/1959 | Schelp | 415/117 |
| 4,009,569 | 3/1977 | Kozlin | 60/39.37 |
| 4,187,054 | 2/1980 | Landis, Jr. et al. | 415/115 |

OTHER PUBLICATIONS

R. J. Mowill et al., "New Radial Engine Technology From Kongsberg" ASME 83-GT-221, paper del. Mar. 1983.

Primary Examiner—Louis J. Casaregola
Assistant Examiner—Timothy S. Thorpe
Attorney, Agent, or Firm—Finnegan, Henderson, Farabow, Garrett & Dunner

[57] ABSTRACT

A toroidally shaped double-walled gas-cooled inlet manifold for a radial in-flow turbine has a plurality of can-type combustors mounted on one axially facing side of the torous, arrays of coolant gas inlet holes in the outer wall located midway between the individual combustors, coolant gas inlet slots distributed circumferentially along the torous on the axial face mounting the combustors, and coolant gas inlet impingement orifices proximate the annular manifold exit duct on both axial facing sides of the outer wall. Annular coolant gas exit ports are provided surrounding the circular combustion gas inlet ducts from the individual combustors to induce a blanketing flow of coolant gas over the entire inner wall.

14 Claims, 5 Drawing Figures

LOW PRESSURE LOSS, CONVECTIVELY GAS-COOLED INLET MANIFOLD FOR HIGH TEMPERATURE RADIAL TURBINE

BACKGROUND OF THE INVENTION

1. Field of the Invention

The invention relates to inlet manifolds for delivering combustion gases to radial-inflow turbines.

2. Description of the Prior Art

In conventional radial in-flow gas turbines, combustion gases are generated in one or more can-type combustors and then fed to a scroll or toroidal-shaped manifold for distribution to an annular turbine inlet guide vane assembly which imparts angular momentum to the hot gases before it enters the turbine blades. Double-walled inlet manifolds are known such as where an inner wall channels the hot combustion gases from the combustors to the turbine inlet nozzle assembly and where a surrounding wall defines a flow passage for a coolant gas to cool the inner wall. It is also known to use compressed air as the coolant gas in such constructions and to channel the heated compressed air to the combustors to be utilized as combustion air and thereby to recover heat values. See e.g. U.S. Pat. No. 2,801,519 (Wood).

Although early double-walled inlet manifolds were essentially entirely convection cooled, that is, film cooling was not utilized, these applications involved relatively low temperature turbine applications where material temperature/strength limits were not in jeopardy. For conventional high temperature turbine applications (i.e. T comb. exit 1100°–1200° C.), film cooling is employed wherein some of the coolant gas is bled from the coolant gas space into the combustion gas space of the manifold to flow along the inner wall surface in much the same manner as conventional can combustors are cooled.

However, film cooling degrades the performance of the turbine by increasing the peak-to-average combustion gas temperature ratio of the gas exiting the manifold and entering the turbine. Thus, an inlet manifold cooled by convection only would be highly desirable for high temperature turbine applications. Also, for high performance/weight applications where the coolant gas used is compressed air intended for utilization as combustion air, it is desirable to have an inlet manifold which has a minimum coolant gas pressure drop while also minimizing the size of the inlet manifold cooling structure. In early convection cooled double-walled inlet manifolds, a counter flow design was employed using relatively large distances between inner and outer manifold walls to reduce pressure drop but this necessarily increased the size and thus the weight of the unit.

SUMMARY OF THE INVENTION

In accordance with the present invention as embodied and broadly described herein, the gas-cooled inlet manifold of the present invention, the manifold being for a radial in-flow turbine and receiving combustion gases from at least one can-type combustor, comprises a first wall in the shape of a hollow torus, the interior space within the first toroidal wall defining in part the flow path for combustion gas from the combustor to the turbine; a second wall in the shape of a hollow torus and surrounding the first wall, the space between the first and second walls defining in part the flow path of the coolant gas; an annular duct positioned at the inner circle of the first and second toroidal wall in flow communication with the interior space, and passing through the second wall, for delivering combustion gases to the turbine, the annular duct being essentially sealed against flow communication with the coolant gas space; a duct positioned in an axial side of the first toroidal wall for receiving combustion gases from the combustor, the duct being in flow communication with the interior space; coolant gas inlet means including (i) a plurality of first coolant gas entry ports, the first ports being positioned in the second wall in an array spaced circumferentially from the circular duct and distributed about the circumference of the generating circle of the second toroidal wall; (ii) a plurality of second coolant gas entry ports, the second ports being elongated slot-shaped and positioned in the second wall axially facing portion, the second ports being distributed circumferentially around the second toroidal wall proximate the annular duct with the respective axes of elongation extending circumferentially; and (iii) a plurality of orifice means positioned in the second wall proximate the annular duct and distributed circumferentially around the second wall on both axial sides of the annular duct, each of the orifice means for directing a stream of coolant gas to impinge upon a preselected portion of the first wall.

Preferably the manifold further including means for inducing coolant gas flowing through said first entry ports to flow circumferentially along said first wall and for inducing coolant gas flowing through said second entry ports to flow axially and radially along said first wall, wherein the inducing means includes providing an annular coolant gas exit port surrounding the combustion gas inlet duct.

It is also preferred that the manifold be used in combination with a gas turbine engine of the type having a radial inflow turbine, at least one can-type combustor in flow communication with the interior space through the annular duct, and in flow communication with the interior space through the circular duct, and means for providing compressed air for utilization as combustion air by the can-combustors, wherein at least some of the compressed air is fed to the first entry ports, the second entry ports, and the orifice means to provide the coolant gas, and wherein the manifold includes at least one coolant gas exit port in flow communication with the can-combustor.

And it is still further preferred that, in the aforementioned combination, the can-combustor combustion gas exit velocities are about 50 m/s, the combustion gas exit temperatures are about 1300° C., and the compressed air tangential velocities in the coolant gas space are about 20–50 m/s.

The accompanying drawing, which is incorporated in and constitutes a part of this specification, illustrates one embodiment of the invention and serves to explain the principles of the invention.

Reference will now be made in detail to the present preferred embodiment of the invention, an example of which is illustrated in the accompanying drawing.

DESCRIPTION OF THE PREFERRED EMBODIMENT

Figure 1:
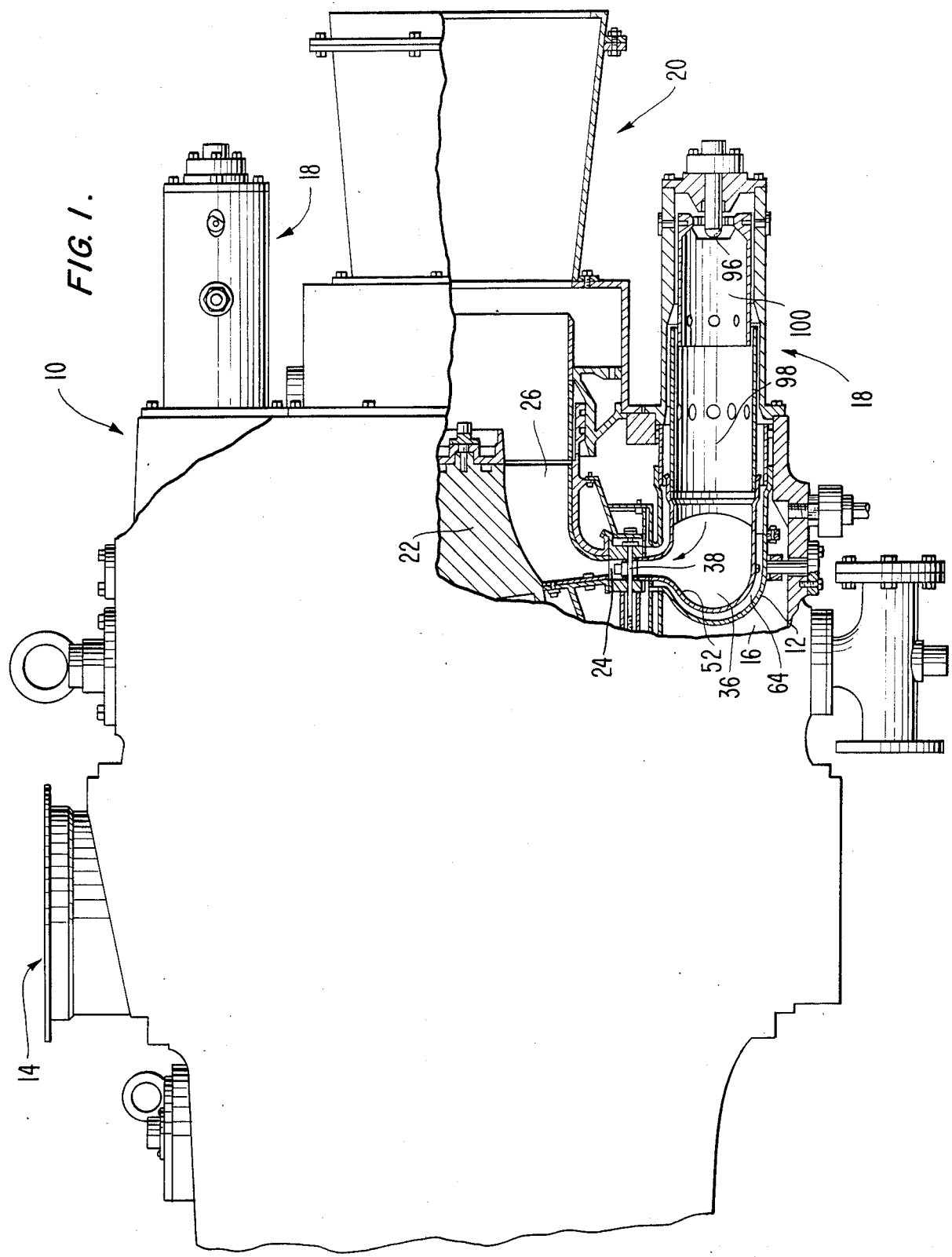
FIG. 1 is a schematic cross-sectional view of a gas turbine engine utilizing a turbine inlet manifold made in accordance with the present invention.

With initial reference to FIG. 1, there is shown a gas turbine engine 10 in which a double-walled turbine inlet manifold designated 12 and made in accordance with the present invention can advantageously be used. Engine 10 includes a centrifugal compressor section 14 for providing compressed air for combustion, which air is provided to plenum 16 essentially surrounding manifold 12. Engine 10 also includes one or more can-type combustors or burners 18 (only two of six shown in FIG. 1) operatively connected to receive compressed air after it has been used for cooling in manifold 12, to combust the compressed air with fuel, and then to deliver hot combustion gases to manifold 12 in a manner that will be described in more detail hereinafter. Engine 10 also includes turbine section 20 having radial inflow turbine 22, with radial inlet 24 and axial outlet 26. Engine 10 is a representative application of inlet manifolds made in accordance with the present invention, and the present invention is not intended to be limited to the particular engine configuration shown in FIG. 1.

Figure 2:
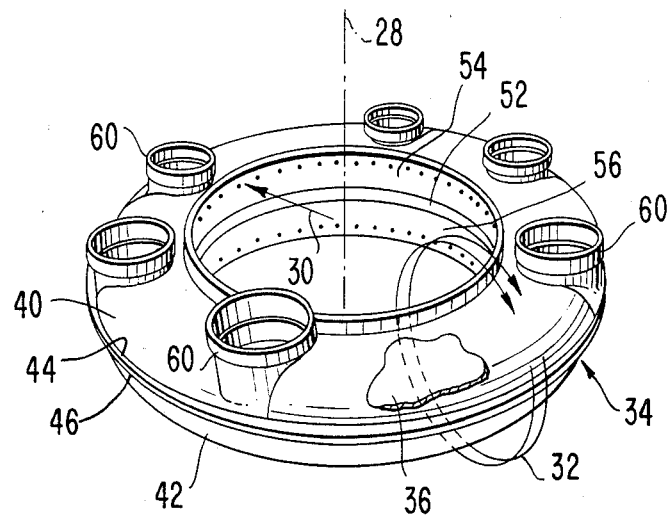
FIG. 2 is a perspective view of the inner wall part of the inlet manifold depicted in FIG. 1.

In accordance with the present invention, the gas cooled inlet manifold for a radial in-flow turbine, the turbine having at least one can-type combustor, includes a first wall in the interior shape of a hollow torus, the space within the first wall defining in part the flow path for combustion gas from the combustor to the turbine. As embodied herein and with particular reference to FIG. 2, as well as FIG. 1, inlet manifold 12 is in the general shape of a torus defined by an axial centerline 28, an inner circle (see radius 30), and generating circle circumference 32 (FIG. 2). Specifically with respect to FIG. 2, double-walled inlet manifold 12 includes an inner or first wall 34 having an interior space 36 which defines part of the combustion gas flow path from the can combustors 18 (not shown in FIG. 2) to inlet 24 of turbine 22. The remaining part of the combustion flow path to turbine 22 is provided by turbine inlet nozzle assembly 38 (FIG. 1). The inner toroidal wall 34 depicted in the figures is fabricated from two axial sides 40, 42 joined at abutting outer peripheral edges 44, 46, respectively by welding.

Figure 5:
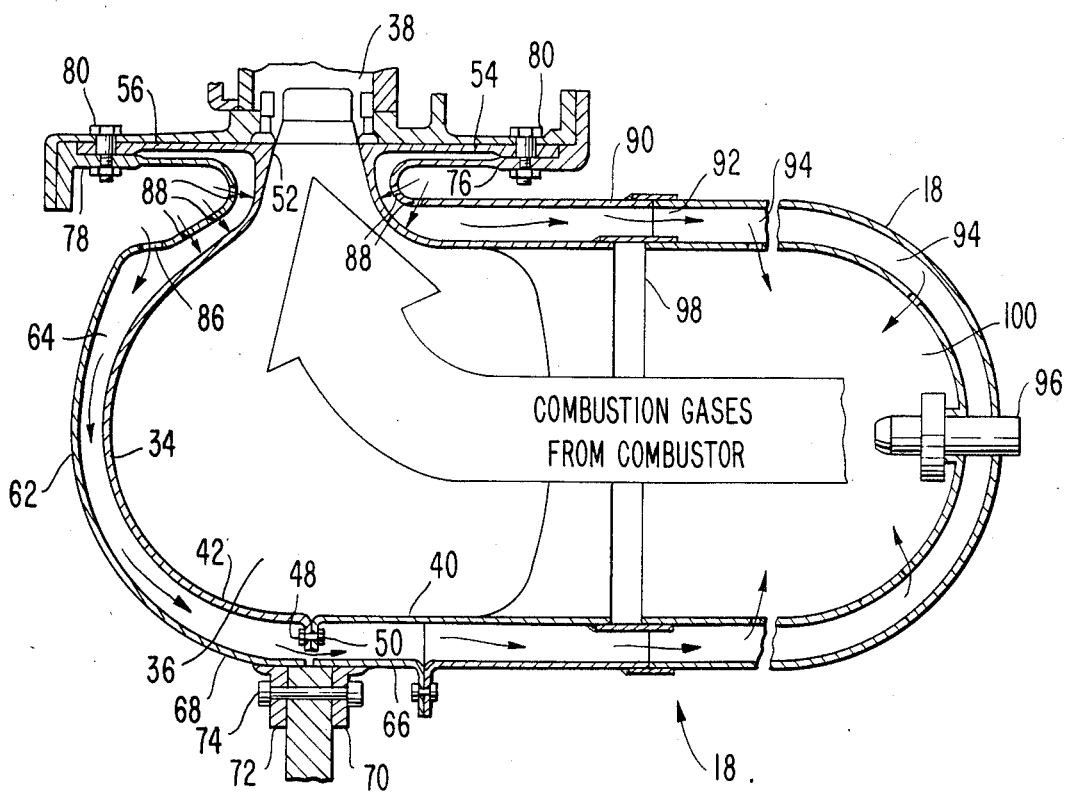
FIG. 5 is a schematic cross-section taken through the inlet manifold of FIG. 1.

However, sides 40, 42 may be joined by bolt fasteners such as 48 depicted in an alternative construction shown in FIG. 5, and bolt fasteners 48 can be advantageously provided with throughholes 50 to allow passage of coolant gas (compressed air) in engine 10, as will be explained hereinafter. Other wall constructions and/or fastening means could be employed, however, and still fall within the intended scope of the present invention. Inner wall 34 can be fabricated from Hastelloy X or an equivalent high temperature alloy.

In accordance with the present invention, the first wall is provided with an annular duct positioned at the inner circle of the first wall, in flow communication with the interior space defined by the first wall for delivering combustion gases to the turbine. As embodied herein, inner wall 34 includes annular duct 52 positioned along inner circle 30, and duct 52 communicates with interior space 36 (see FIG. 2). Duct 52 is formed by respective flange portions 54, 56 of inner wall sides 40, 42 (see cross-section in FIG. 5). Duct 52 also communicates with inlet nozzle 38 to provide combustion gases from space 36 to turbine 22 as shown in FIG. 1.

In accordance with the present invention, the inner wall also is provided with a duct positioned in an axial side of the wall for receiving combustion gases from the combustor, the duct being in flow communication with the interior space defined by the first wall. As embodied herein, a total of 6 circular ducts 60 are provided in wall side 40 of inner wall 34 in flow communication with inner space 36. Ducts 60 are distributed circumferentially about the torus and aligned substantially parallel to axis 28, for connection to a like number of can combustors 18. It is apparent that even with the two-sided inner wall construction shown in FIG. 2, can combustors 18 can be angled from axis 28 if additional clearance is needed for components at the aft end of engine 10 without departing from the scope or spirit of the present invention. Ducts 60 are shown essentially circular in cross-sectional shape, but other geometric shapes can be used to accommodate different can combustor geometries.

Figure 3:
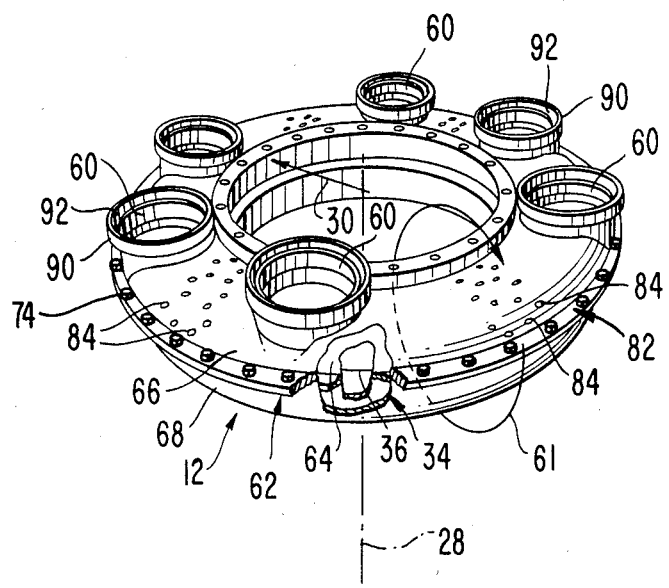
FIG. 3 is a perspective view of the inlet manifold of FIG. 1 showing assembled inner and outer wall parts.

Further in accordance with the present invention, the double-walled inlet manifold is provided with a second or outer wall also in the shape of a hollow torus and surrounding the inner wall, and the space between the inner and outer walls defining in part the flow path of the coolant gas. As embodied herein, and as particularly shown in FIG. 3, outer wall 62 is toroidal in shape having essentially the same major axis 28 and closely surrounding inner wall 34 to form a space 64 for coolant gas flow. Outer wall 62 is fabricated from axial sides 66, 68 joined at the outer peripheral edges 70, 72 respectively, by bolt fasteners 74. Flanged inner edges 76, 78 of outer wall 62 are connected to the respective flanged edges 54, 56 of inner wall 34 by bolt fasteners 80. The depicted construction provides rigidity to the overall inlet manifold structure and also means for conveniently connecting to other components of engine 10 including inlet nozzle assembly 38. Other constructions and/or fastening means for outer wall 62 are possible without departing from the scope or spirit of the present invention. The outer wall can advantageously be fabricated from INCO 718 or an equivalent alloy.

Importantly, interior space 36 which channels the combustion gases is sealed against direct flow communication with the coolant gas space 64. The coolant gas in space 64 thus provides only convection cooling to inner wall 34; wall 34 does not have apertures, orifices, etc. for providing passage of coolant gas from space 64, through wall 34 to interior space 36, to film cool the inside surface of wall 34. The absence of film cooling is expected to significantly reduce the spatial peak-to-average ratio of the temperature of the combustion gas exiting manifold 12 through duct 52 and thereby to increase the thermal efficiency of turbine 22.

Still further in accordance with the present invention, the inlet manifold is provided with inlet means for introducing coolant gas into the coolant gas space between the inner and outer walls. The inlet means includes a plurality of first coolant gas entry ports, the first ports being positioned in the second wall in an array spaced circumferentially from the combustion gas inlet duct and also distributed about the circumference of the generating circle of the second toroidal wall. As embodied herein, and with reference to FIG. 3, six separate arrays 82 of individual circular holes 84 are spaced circumferentially around the toroidal wall 62 from the individual circular ducts 60. The arrays 82 are formed in outer wall 62, essentially equidistant from the respective ducts 60. Holes 84 of each array 82 are distributed over the circumference of generating circle 32 of outer wall 62 and are sized collectively to admit about 43% of the total coolant gas supplied to space 64 from a common coolant gas source, such as compressed air from plenum 16 in engine 10. In the presently described embodiment, as shown in FIG. 2, a total of 6 arrays of 22 holes are each employed. Each hole is 8.5 mm in diameter and 14 of the 22 holes in each array are on the same axial side of the torous as the combustors.

Figure 4:
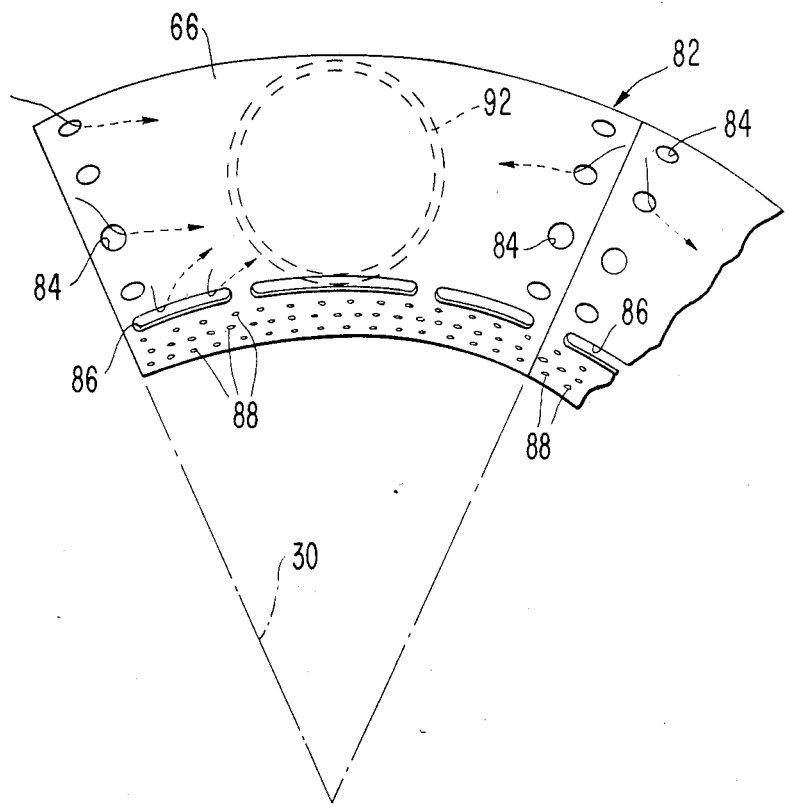
FIG. 4 is a schematic view of a portion of the inlet manifold of FIG. 1.

Also in accordance with the present invention, the coolant gas inlet means also includes a plurality of second coolant gas entry ports, the second ports being elongated, slot-shaped and positioned in the second wall, the second ports being distributed circumferentially around the second toroidal wall proximate the annular duct. As embodied herein, and as best seen in FIG. 4, elongated slots 86 are distributed circumferentially between hole arrays 82 and inner circle 30 on side 68 of outer wall 62 (opposite side from the combustors), with the axis of elongation also oriented circumferentially. Slots 86 collectively are sized to admit about 43% of the total coolant gas flow from a common pressure source with holes 84. In the described embodiment, there are a total of 22 slots, 6 of which are each 100 mm long and 10.2 mm wide. The remaining 16 slots are each 53 mm long and 19 mm high.

Also in accordance with the present invention, the coolant gas inlet means further includes a plurality of orifice means positioned in the second wall proximate the annular duct and distributed circumferentially around the second wall on both axial sides of the annular duct, each of the orifice means for directing a stream of coolant gas to impinge upon a preselected portion of the inner wall. As embodied herein and with continued reference to FIG. 4, a plurality of orifice holes 88 are distributed circumferentially around the toroidal wall 62 adjacent inner circle 30 on both axial sides 66 and 68. Coolant gas flowing through orifice holes 88 impinges on the underlying portions of inner wall 34 to provide cooling in areas of inner wall 34 adjacent duct 52 where higher combustion gas velocities, and correspondingly high heat transfer coefficients and amounts of heat transfer, occur. These areas also would be possible flow stagnation areas in space 64, except for the presence of orifice holes 88. Collectively, orifice holes 88 are sized to emit about 14% of the total coolant gas flow for convection cooling of inner wall 34 when fed from a common coolant gas pressure source with slots 86 and holes 84. In the described embodiment, there are three groups of orifice holes located in three circumferential rings on each axial side (see FIG. 4). There are a total of 112 orifice holes of 3.5 mm diameter and 22 holes of 5 mm diameter on each axial side.

Further in accordance with the present invention, the inlet manifold is provided with coolant gas exit means located in the second wall closely adjacent the combustion gas-receiving ducts. As embodied herein, and with reference to FIGS. 2 and 3, flanged extensions 90 of outer wall 62 are provided to surround circular ducts 60 at locations where ducts 60 pass through outer wall 62, which flanged extensions 90 together with ducts 60 form annular exit ports 92. As best seen in FIG. 5, annular ports 92 are flow connected with the interior space 94 of can-type combustors 18, which are double-walled, for supplying combustion air for mixing and combustion with the fuel from fuel nozzle 96 and for lowering the temperature of combustion gas leaving combustion chamber 100.

As can best be seen in FIG. 4, the coolant gas inlet means, including arrays 82 of holes 84, slots 86, and impingement orifice holes 88, together with annular exit ports 92 provides uniform cooling of the outside surface of inner wall 34. Coolant gas flow after entering through holes 84 is basically circumferential toward the nearest exit port 92, while the coolant gas flow after entrance through slots 86 and orifice holes 88 is mixed but basically axial and radial toward the nearest exit port 92. For the inlet manifold shown in the figures, having about a 12 mm radial distance between inner wall 34 and outer wall 62, the average coolant gas velocities in space 64 are about 20-30 m/s. However, higher velocities such as up to about 50 m/s may be required in other applications. When used in conjunction with can-type combustors 18 each having relatively a low average exit velocity of about 50 m/s and with an average combustor exit temperature of about 1300° C., low heat transfer coefficients on the order of about 25 BTU/HR/FT$^2$/°F. result enabling inlet manifold 12 to be entirely convection cooled without the need for film cooling with attendant losses in thermal efficiency. In the embodiment shown in the figures, essentially all the compressed air used as a coolant gas is channeled to the combustors via exit ports 92.

It will be apparent to those skilled in the art that various modifications and variations can be made in the turbine inlet manifold of the present invention without departing from the scope or spirit of the invention.

What is claimed is:

1. A gas-cooled inlet manifold for a radial in-flow turbine, the manifold receiving combustion gases from at least one can-type combustor, the manifold comprising:

a first wall in the shape of a hollow torus having an axis, the interior space within said first toroidal wall defining in part the flow path for combustion gas from the combustor to the turbine;

a second wall in the shape of a hollow torus and surrounding said first wall, the space between said first and second walls defining in part the flow path of the coolant gas;

an annular duct positioned at the inner circle of said first and second toroidal wall and being in flow communication with said interior space, and passing through said second wall, for delivering combustion gases to the turbine, said annular duct being essentially sealed against flow communication with said coolant gas space;

a duct positioned in an axial side of said first toroidal wall for receiving combustion gases from the combustor, said duct also passing through said second wall and being in flow communication with said interior space;

coolant gas inlet means including
(i) a plurality of first coolant gas entry ports, said first ports being positioned in said second wall in an array spaced circumferentially from said combustion gas inlet duct and distributed about the circumference of the generating circle of said second toroidal wall,
(ii) a plurality of second coolant gas entry ports, said second ports being elongated slot-shaped and positioned in an axial side of said second wall, said second ports being distributed circumferentially around said second toroidal wall proximate said annular duct with the respective axes of elongation extending circumferentially and (iii) a plurality of orifice means positioned in said second wall proximate said annular duct and evenly distributed circumferentially around said second wall on both axial second wall sides of said annular duct, each of said orifice means for directing a stream of coolant gas to impinge upon a preselected portion of said first wall.

2. The manifold as in claim 1 further including means for inducing coolant gas flowing through said first entry ports to flow predominantly circumferentially along said first wall and for inducing coolant gas flowing through said second entry ports to flow predominantly axially and radially along said first wall.

3. The manifold as in claim 2 wherein said inducing means includes a coolant gas exit port proximate said combustion gas inlet duct.

4. The manifold as in claim 3 wherein said combustion gas inlet duct is circular and said coolant gas exit port is annular in shape and positioned to surround said circular duct.

5. The manifold as in claim 1 wherein said first and second ports and said plurality of orifice means are all to be fed from the same source of coolant gas and are sized to provide a coolant gas flow split of about 43%:43%:14% among said first ports, said second ports, and said orifice means, respectively.

6. The manifold as in claim 1 wherein the radial distance between said first wall and said second wall in said coolant gas space is about 12 mm.

7. The manifold as in claim 1 wherein said coolant gas flow space is configured to provide tangential velocities for the coolant gas flowing through said first ports of about 20–50 m/s.

8. The manifold as in claim 1 having a plurality of said ducts each for flow communication with a separate can-type combustor, and having a plurality of said first coolant gas entry port arrays distributed between said circular ducts.

9. The manifold as in claim 8 having six ducts each having a substantially circular cross section, and six arrays of first entry ports.

10. The manifold as in claim 1 in combination with a gas turbine engine of the type having a radial in-flow turbine, at least one can-type combustor in flow communication with said interior space through said annular duct, and in flow communication with said interior space through said combustion gas inlet duct, and means for providing compressed air for utilization as combustion air by the cancombustors, wherein at least some of the compressed air is fed to said first entry ports, said second entry ports, and said orifice means to provide the coolant gas, and wherein the manifold includes at least one coolant gas exit port in flow communication with said can-combustor.

11. The apparatus as in claim 10 wherein essentially all of the compressed air used for cooling said first wall is used for combustion.

12. The apparatus as in claim 10 wherein said can combustor combustion gas exit velocities are about 50 m/s, and combustion gas exit temperatures are about 1300° C., and wherein said first and second entry ports are sized and positioned such that said compressed air tengential velocities in said coolant gas space are about 20–50 m/s.

13. The manifold as in claim 1 wherein said first wall comprises two axial side parts having abutting flanged-peripheral edges, and a plurality of bolt fasteners joining said abutting flanged edges, each of said bolt fasteners having an axial through-hole for facilitating coolant gas flow past said edges.

14. The manifold as in claim 1 wherein said second coolant gas entry ports are positioned in the axial side opposite the side on which said combustion gas inlet ducts are positioned.

* * * * *